United States Patent
Biskeborn et al.

(10) Patent No.: US 7,167,339 B2
(45) Date of Patent: Jan. 23, 2007

(54) METHOD FOR PRODUCING AND INSPECTING TAPE HEAD AIR-SKIVING EDGES

(75) Inventors: Robert Glenn Biskeborn, Hollister, CA (US); Luis Hector Palacios Borja, Mountain View, CA (US); Calvin Shyhjong Lo, Saratoga, CA (US); Kevin Thuy Luong, San Jose, CA (US); Sassan K. Shahidi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 10/727,788

(22) Filed: Dec. 3, 2003

(65) Prior Publication Data

US 2005/0122631 A1   Jun. 9, 2005

(51) Int. Cl.
*G11B 5/187*   (2006.01)
(52) U.S. Cl. .................... 360/122; 29/603.16
(58) Field of Classification Search .............. None
See application file for complete search history.

(56) References Cited

U.S. PATENT DOCUMENTS

| | | | |
|---|---|---|---|
| 4,624,048 A | 11/1986 | Hinkel et al. ................. 29/603 |
| 5,485,335 A * | 1/1996 | West ......................... 360/122 |
| 5,718,035 A | 2/1998 | Yamanaka et al. ......... 29/603.1 |
| 5,722,156 A | 3/1998 | Balfrey et al. ........... 29/603.08 |
| 5,749,769 A | 5/1998 | Church et al. ................. 451/5 |
| 5,883,770 A | 3/1999 | Biskeborn et al. ..... 360/130.21 |
| 5,905,613 A | 5/1999 | Biskeborn et al. ..... 360/130.21 |
| 6,081,991 A | 7/2000 | Tsunoda et al. ......... 29/603.08 |
| 6,288,873 B1 | 9/2001 | Lundquist et al. ....... 360/234.6 |
| 2002/0094758 A1 | 7/2002 | Reiley et al. ................. 451/8 |

* cited by examiner

*Primary Examiner*—Robert S. Tupper
(74) *Attorney, Agent, or Firm*—Zilka-Kotab, PC

(57) ABSTRACT

A method is provided for providing air-skiving edges of a tape head. A slot is created in an upper face of a substrate of a tape head. The slot includes at least one edge defining an edge of a tape bearing surface (TBS) of the tape head. The surface of the tape head is then formed and finished, such as by lapping. A grind operation is subsequently conducted to form a notch in the upper face of the substrate of the tape head. Such notch extends from the slot to an outside end of the substrate of the tape head.

16 Claims, 6 Drawing Sheets

METHOD FOR PRODUCING AND INSPECTING TAPE HEAD AIR-SKIVING EDGES

FIELD OF THE INVENTION

The present invention relates to magnetic head fabrication, and more particularly, this invention relates to a method for improving the quality of edges of tape head air bearing surfaces.

BACKGROUND OF THE INVENTION

Prior Art FIG. 1 illustrates a method 100 of manufacturing a conventional tape head for a linear tape drive. As shown, in operation 102, a plurality of "quads" is cut from a wafer, which may be further cut into "mini-quads." Thereafter, a plurality of closures is bonded to the mini-quads. See operation 104. Next, in operation 106, the closures are ground and an extender bond operation is performed. At this point, in operation 108, a tape bearing surface (TBS) is lapped, after which the mini-quad is sliced to provide a plurality of "rows" each with a planar TBS.

With continuing reference to FIG. 1, a back portion of each row is lapped and inspected. See operation 110. The rows are then subjected to a magnetic test in operation 112, followed by additional inspections and measurements in operation 114. It is at this time that the rows are trimmed to afford "chiplets" and cleaned in operation 116.

The "chiplets" are bonded to U-beams in operation 118 and again inspected and measured in operation 120. Grinding is then carried out in operation 122 to notch a portion of each head. Such grinding is carried out to reduce the area on which a tape passes during use. By doing so, the tape is guided over the head in an optimal manner.

Finally, in operations 124–128, a magnetoresistive profile of each head is enhanced and again inspected and measured, after which a final cleaning operation is performed. More information regarding a number of the foregoing operations will be set forth with reference to the following figures.

Prior art FIG. 2 illustrates a mini-quad 200 of heads 202 that have been cut from a wafer, in accordance with operation 102 of FIG. 1. As shown, the mini-quad 200 includes two columns of multiple rows of heads 202. During the fabrication of the mini-quad 200, an array of heads 202 including transducers and auxiliary circuits are fabricated on a common substrate in a deposition of metallic and non-metallic layers. The auxiliary circuits are sometimes referred to as electrical lap guides (ELGs). Patterning of the array of transducers and ELGs is accomplished using photolithography in combination with etching and lift-off processes.

Prior art FIG. 3 illustrates a mini-quad 300 including a plurality of strips of closures 302 attached thereto, in accordance with operations 104 and 106 of FIG. 1. Such closures 302 define a plurality of slots 304 in which contacts 306 associated with the ELGs reside. Such closures 302 have recently become a common part of wafer processing in view of the benefits they afford in resultant heads. More information on the manufacture and use of closures 302 and the related benefits may be found with reference to U.S. Pat. Nos. 5,883,770 and 5,905,613 which are incorporated herein by reference in their entirety.

Prior art FIG. 4 illustrates a head 400 after the lapping and tests of operations 108–114, the trimming of operation 116 and the attachment of the U-beam of operation 118 of FIG. 1. To conserve wafer utilization, the head 400 is extremely thin in shape and form. In order to increase the stability of the head 400 for the suitable use thereof, the head 400 is attached to a beam 404 of some sort formed of a rigid material. Such beams 404 are often referred to as a "U-beams." Again, the closure 402 is shown in FIG. 4.

Prior art FIG. 5 illustrates a head 500 after the grind of operation 122 of FIG. 1. Such grind renders a notch 502 which allows a proper wrap angle of a tape as it moves over an TBS 504 of the head 500 during use.

Prior art FIG. 6 illustrates a side view of the head 500, taken along line 6—6 of FIG. 5. As shown, the grind can result in chipping and irregular height 600 along an outside edge of the TBS 504. Such defects 600 have exhibited rough features several hundred Angstroms in height and several microns in depth. In the past, such defects 600 have been controlled by using slow cutting and resin-bonded wheels. Unfortunately, such techniques are slow and the resultant edge quality is critically dependent on grind wheel condition.

In use, defects 600 of such magnitude result in problems in the manner in which the tape moves over the TBS 504. For example, a fly height (i.e. the distance between the tape and the TBS) may not be effectively controlled and maintained. There is thus a need to provide a TBS with edges that are smooth and free from defects resulting from the grind procedure.

SUMMARY OF THE INVENTION

A method is provided for improving the air skiving edges of a tape head. A slot is created in an upper face of a substrate of a tape head. The slot includes at least one edge defining an edge of a tape bearing surface (TBS) of the tape head. The TBS of the tape head is then formed and finished, such as by lapping. A grind operation is subsequently conducted to remove unwanted material in the upper face of the substrate of the tape head. A notch is thus formed which extends from the slot to an outside end of the substrate of the tape head.

The edge of the TBS of the tape head may include defects after the slot is created. However, the finishing is performed after the slot is created, and thus the defect is removed. Moreover, the grind operation may be performed after forming and finishing the TBS of the tape head, such that the edges of the TBS of the tape head are not disturbed and so no longer exhibit resultant defects.

In one embodiment, the slot may include a depth substantially equal to a depth of the notch. Moreover, a length of the slot may be substantially equal to a length of the material that is removed.

In use, the notch removes material and allows control of a wrap angle of a tape when passing over the TBS of the tape head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior art

Prior art

Prior art

Prior art

Prior art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
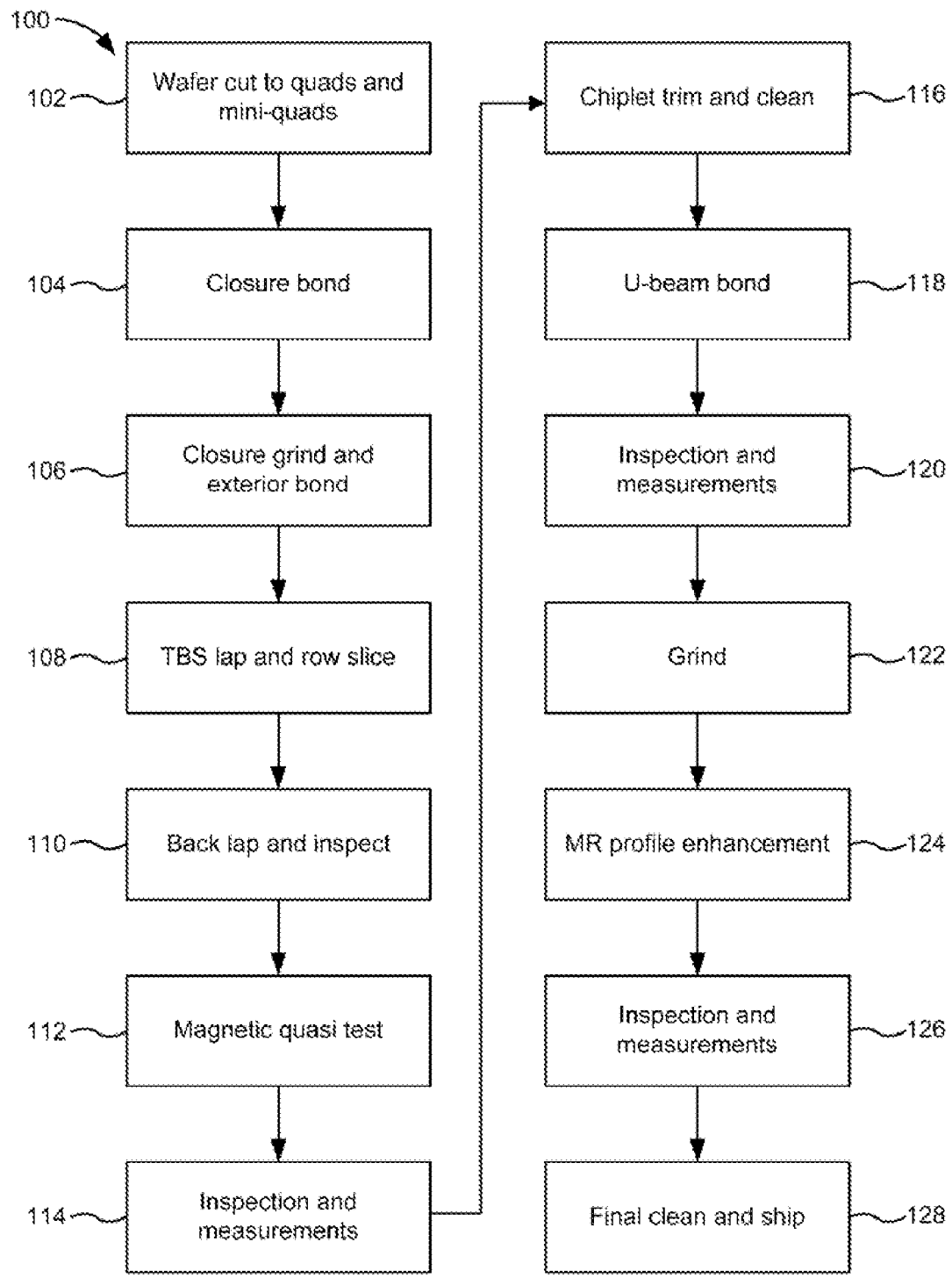
FIG. 1 illustrates a method of manufacturing a conventional tape head for a linear tape drive.
Figure 2:
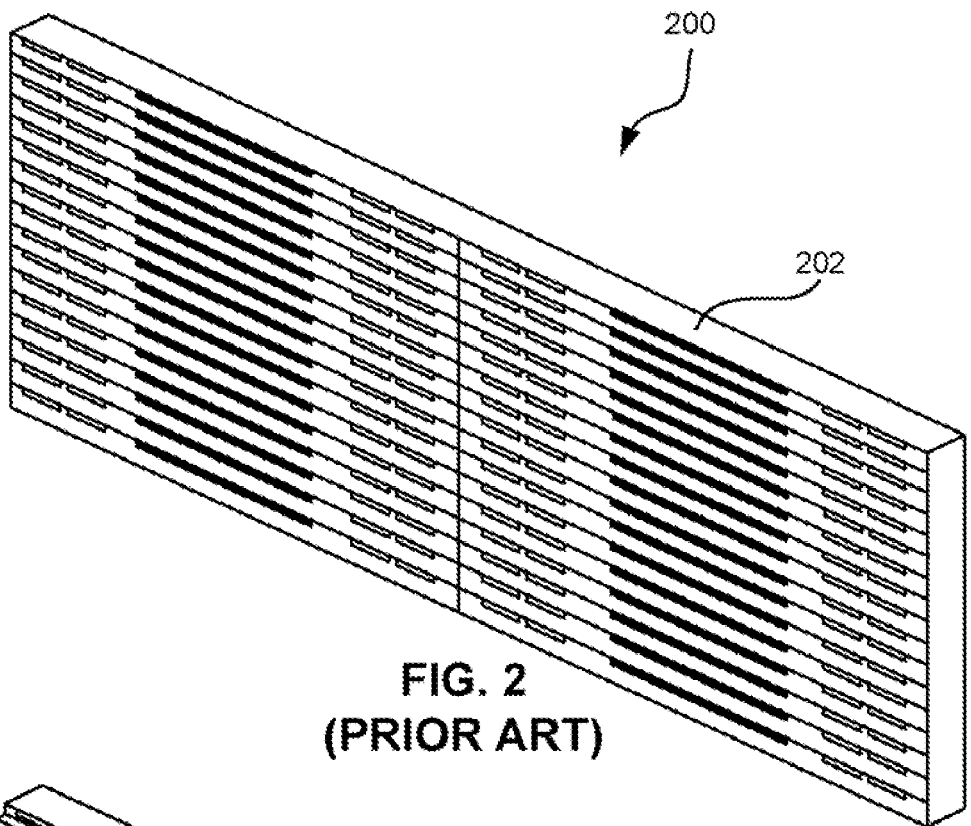
FIG. 2 illustrates a mini-quad of heads that have been cut from a wafer.
Figure 3:
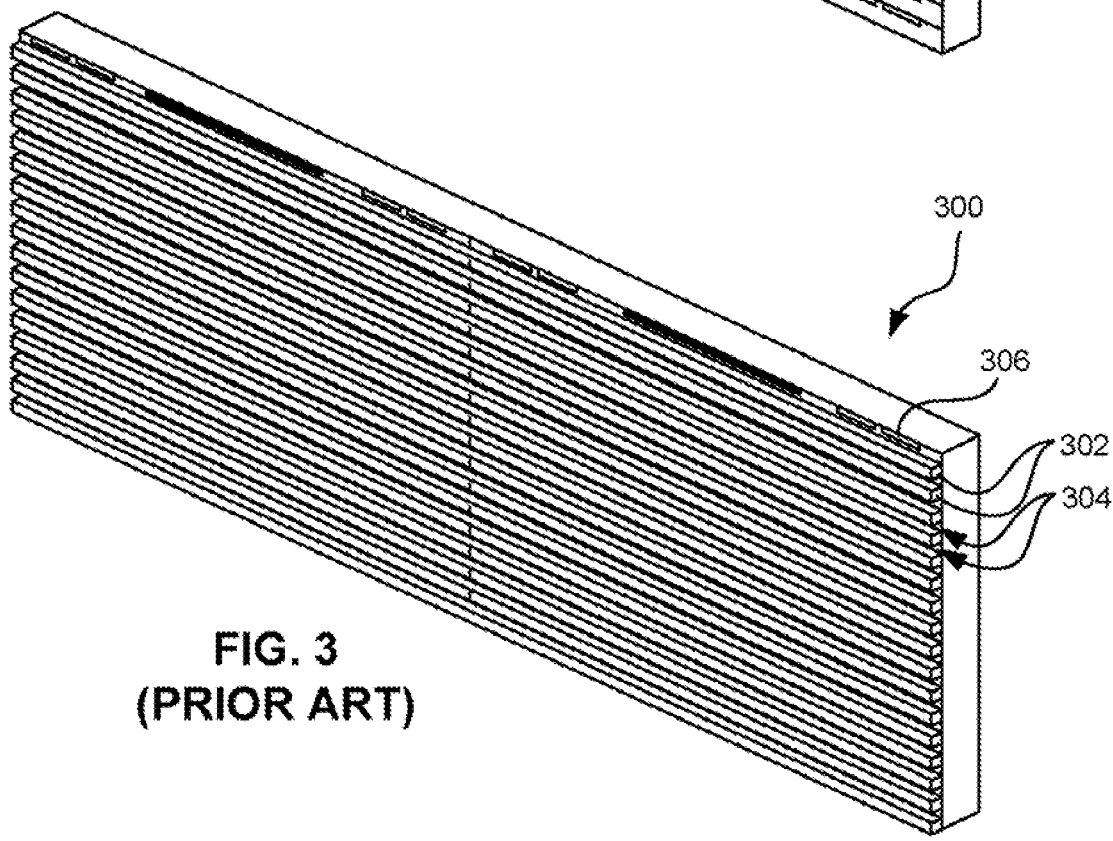
FIG. 3 illustrates a mini-quad including a plurality of strips of closures attached thereto.
Figure 4:
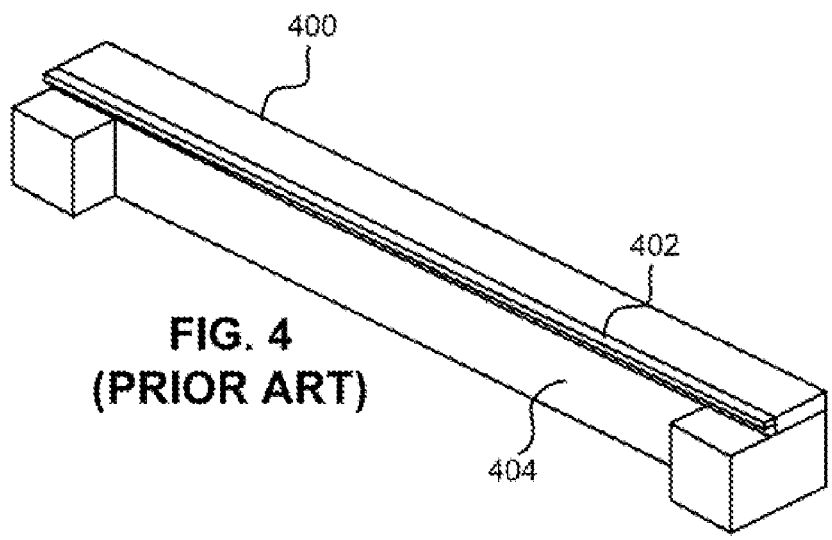
FIG. 4 illustrates a head after the finishing and tests, the trimming, and the attachment of the U-beam of FIG. 1.
Figure 5:
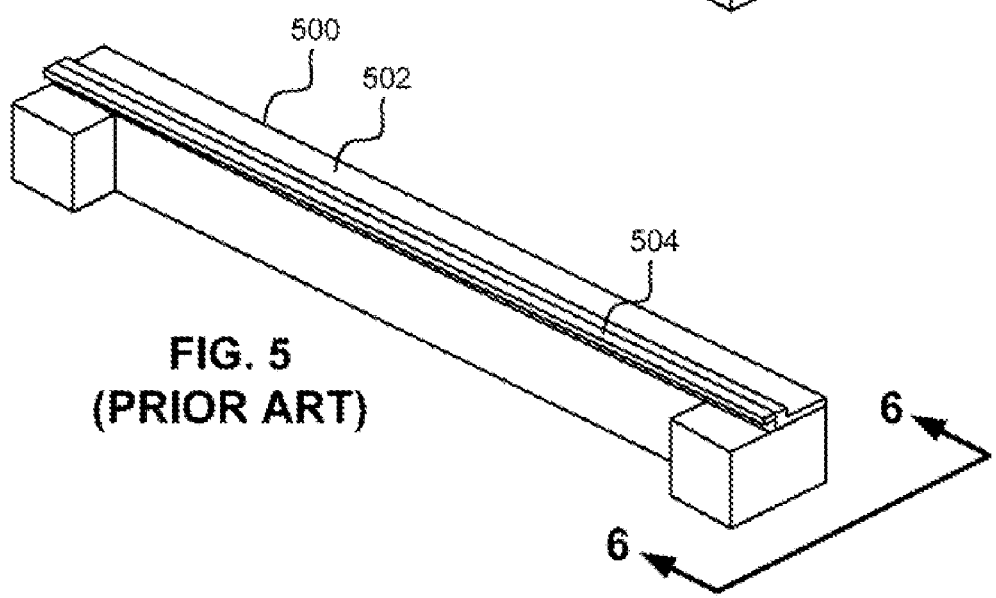
FIG. 5 illustrates a head after the grind operation of FIG. 1.
Figure 6:
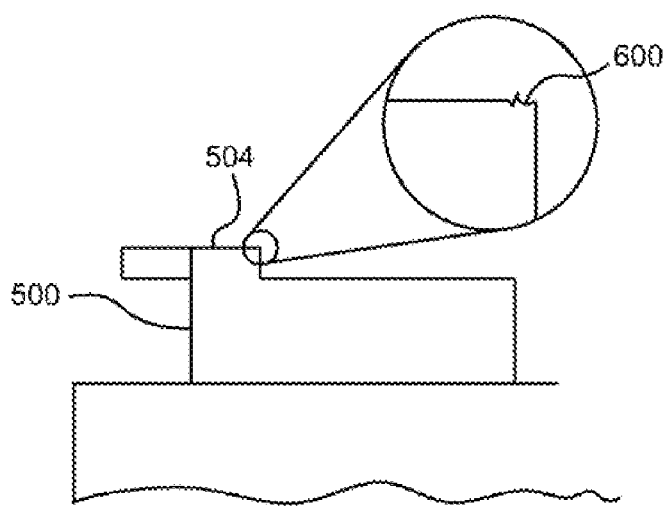
FIG. 6 illustrates a side view of the head, taken along line 6—6 of FIG. 5.
Figure 7:
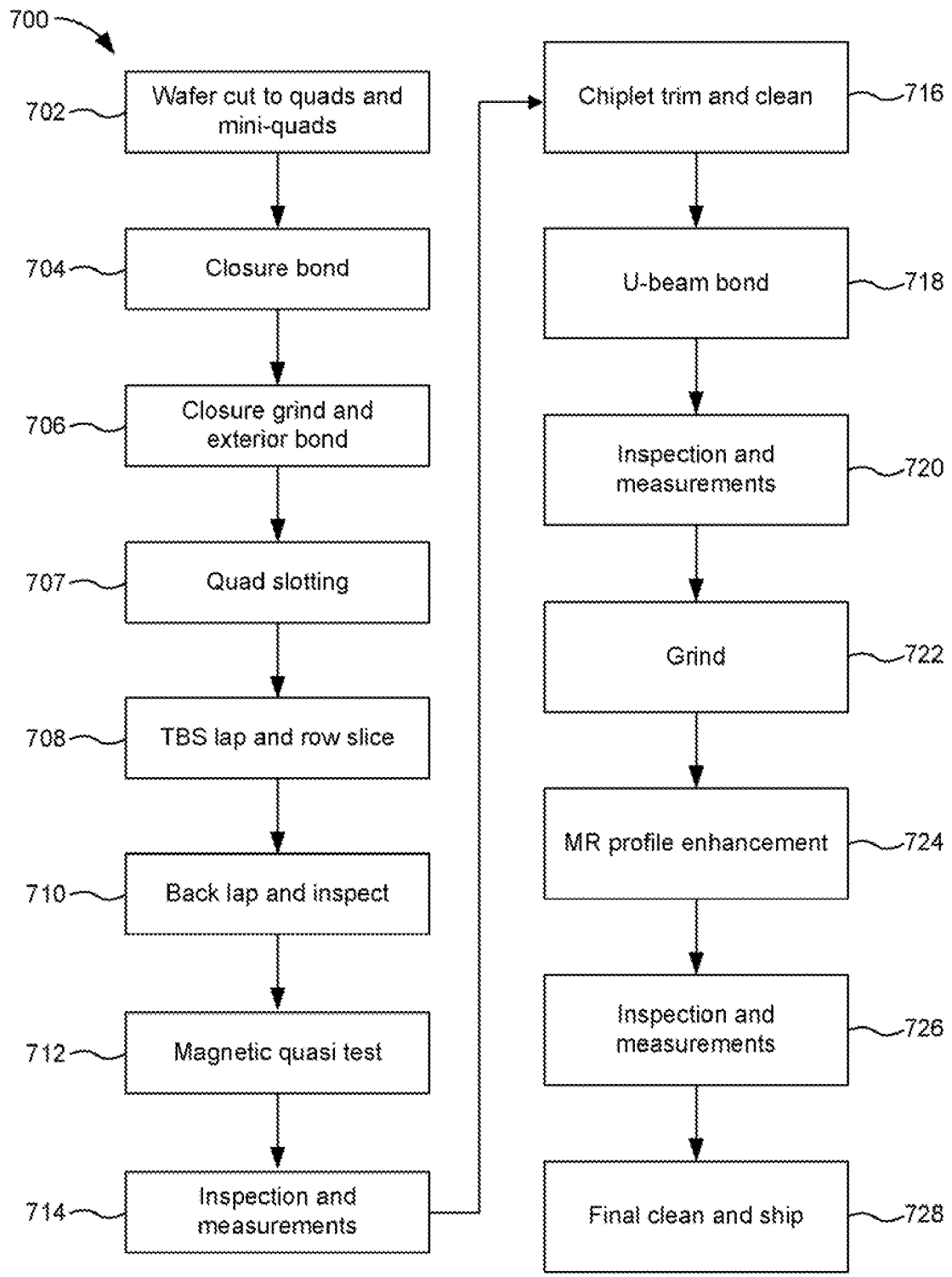
FIG. 7 illustrates a method of manufacturing a tape head for a linear tape drive, in accordance with one embodiment.

Prior Art FIGS. 1–6 illustrate the prior art. FIG. 7 illustrates a method 700 of manufacturing a tape head for a linear tape drive, in accordance with one embodiment. As shown, in operation 702 a plurality of "quads" are cut from a wafer, which may further be cut into "mini-quads." This may be accomplished utilizing a very narrow width dicing blade. In the context of the present description, each of the quads may include a plurality of tape heads, which may be used in the context of a linear tape drive for reading/writing data stored on a linear tape in a manner that will soon be set forth.

Thereafter, a plurality of closures is bonded to the quads. See operation 704. In the context of the present description, such closures may each include any member extending from a substrate of the associated device. Next, in operation 706, the closures are ground and an extender bond operation is performed. At this point, a tape bearing surface (TBS) is defined.

In prior art processes, the method 700 would conventionally continue by a finishing process, such as lapping the TBS, slicing the mini-quads into rows, etc. Instead, however, a slot is created in an upper face of a substrate of each device. See operation 707. Such slot includes at least one edge which defines an outside edge of the TBS of the associated device. In one embodiment, such slot may be created using an MTI® grinding machine or the like.

As a result of creating the foregoing slot in operation 707, the edge of the TBS of the tape head may include a defect after the slot is created. Such defects are similar to those set forth during reference to prior art FIG. 6. More information relating to the structure of such slot will be set forth during reference to FIGS. 8A and 8B.

At this point, in operation 708, the TBS is finished by lapping with a slurry of fine particles, and the mini-quads are sliced to afford a plurality of "rows" each with a planar TBS. In the context of the present description, such lapping may involve any smoothing operation. Since such lapping is performed after the slot is created, the aforementioned defect is reduced or removed, and a uniform outside edge profile remains. As will soon become apparent, the subsequent grind operation is for material removal and does not produce any defects at the outside edge of the TBS.

With continuing reference to FIG. 7, a back portion of each row is lapped and inspected. See operation 710. The rows are then subjected to a magnetic test in operation 712, followed by additional inspections and measurements in operation 714. It is at this time that the rows are trimmed to afford separate devices, or "chiplets," and cleaned in operation 716. To provide the clean "chiplets" with support, they are bonded to U-beams in operation 718 and again inspected and measured in operation 720.

A material removal grind is then carried out in operation 722 to notch a portion of each head. In particular, such grind operation 722 is conducted to form a notch in the upper face of the substrate of each tape head. Such notch extends from the slot formed in operation 707 to an outside end of the substrate of the tape head. Since the grind operation does not extend beyond the slot, the air-skiving edge of the TBS no longer exhibits resultant defects.

In use, the notch facilitates control of a wrap angle of a tape when passing over the TBS. Moreover, smooth outside edges ensure that fly height is effectively controlled and maintained during operation of the resultant tape head. To this end, a write and read performance of the tape head is maximized.

As set forth hereinabove, the slot is generated in operation 707, which is followed by the finishing operation 708, which in turn is followed by the material removal grind of operation 722; with various other operations (i.e. operation 710–720) therebetween. It should be noted, however, that the slot in the TBS may be generated at any time prior to the finishing, and the finishing may take place at any time prior to the material removal grind to achieve the desired result.

Moreover, in another embodiment, the slotting operation 707 may be avoided by grinding as in conventional processes, but doing so before lapping, and then lapping the rows. Since conventional lapping machines which carry out the lapping process of operation 708 are specifically designed to carry out such procedure prior to row slicing, trimming, and U-beam bonding (see operations 708, 716, 718, etc.), the lapping process may have to be modified for lapping the ground rows.

There are four ways to achieve good skiving edges. A preferred method is to form a slot, finish (lap), and grind. As mentioned above, another method is to form a slot, grind, then finish. A further way to achieve good skiving edges is to grind the edge before lapping, then lap. Yet another method includes cutting rows off of the quads, bonding the rows to U-beams, and then performing any of the methods discussed previously in this paragraph.

Thereafter, in operations 724–728, a magnetoresistive profile of each head is enhanced and inspected and measured again, after which a final cleaning operation is performed prior to shipping.

Figure 8A:
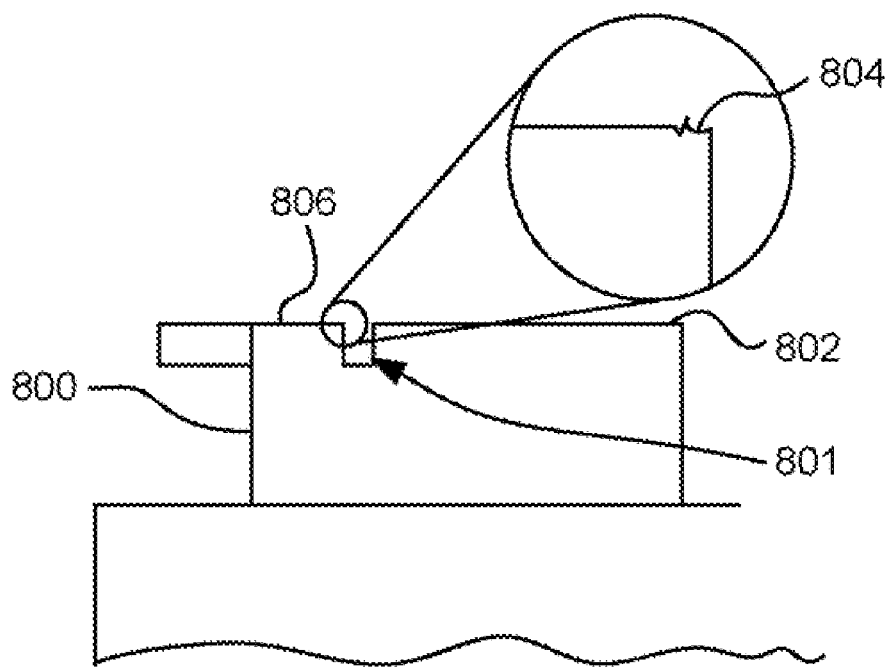
FIG. 8A illustrates a side view of a tape head with a slot formed therein, in accordance with one embodiment.

FIG. 8A illustrates a side view of a tape head 800 with a slot 801 formed therein, in accordance with one embodiment. Such slot 801 may, in one embodiment, be generated in the context of operation 707 of FIG. 7. It should be noted, however, that the slot may be formed in any desired context.

As shown, the slot 801 is created in an upper face 802 of a substrate of each device. Such slot 801 includes at least one edge 804 which defines an outside edge of an TBS 806 of the associated device.

In one embodiment, the slot 801 may include a depth substantially equal to a depth of the notch created in operation 722 of FIG. 7. Moreover, a length of the slot 801 may be substantially equal to a length of the notch. In one embodiment, the depth of the notch may be 150 um. As shown in FIG. 8A, the edge 804 of the slot 801 exhibits a defect similar to that exhibited by the prior art.

Figure 8B:
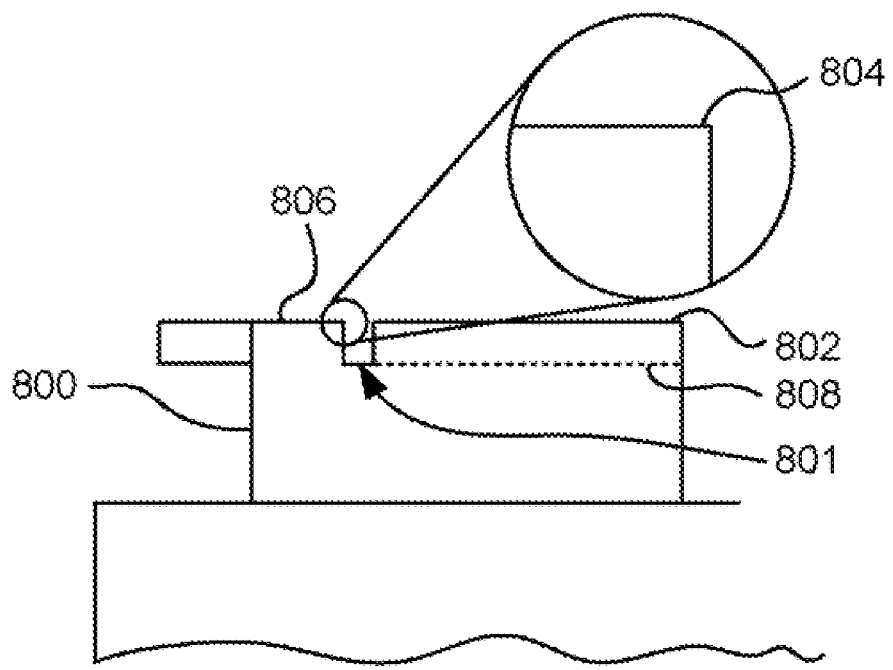
FIG. 8B illustrates a side view of a tape head after a finishing operation is carried out, in accordance with one embodiment.

FIG. 8B illustrates a side view of a tape head 800 after a finishing operation is carried out, in accordance with one embodiment. Such finishing operation may be that set forth in operation 708 of FIG. 7. Of course, such tape head 800 may be the result of any desired finishing process.

As shown, the edge 804 of the slot 801 no longer exhibits a defect, and the TBS 806 (including the edges) remains smooth. In one embodiment, such process provides an edge with an isolated defect preferably less than 300 Angstroms in height, more preferably less than 200 Angstroms in height, and most preferably less than 100 Angstroms in height, and less than 100–500 nm in depth. Of course, any reduced level of rough features may be exhibited.

Thus, in operation 722, the material removal grind may be used to remove a remaining portion of the substrate at a depth and length similar to the slot to define a resultant notch 808. As mentioned earlier, the notch 808 facilitates control of a wrap angle of a tape when passing over the TBS 806, and the TBS 806 maintains a smooth outside edge so that a fly height may be effectively controlled and maintained during operation of the resultant tape head 800. Thus, a write and read performance of the tape head 800 is maximized.

As an option, the aforementioned edge quality may be assured via a process that measures any remaining defects with an interferometer (i.e. ZYGO, WYCO or any other suitable device), which scans an area of the surface encompassing the edge 804. The resultant data may then be examined to ensure that the edge 804 is in the same plane as, or slightly below, the plane of the "interior" portion, to ensure that the edge 804 is free from defects. In one embodiment, such technique may be used to ensure that the edge 804 is less than approximately 30 Angstroms higher, on average, than the remaining portion. Thus, inspecting in such fashion and imposing this acceptance criteria assures a high quality edge 804. Moreover, it removes the need to inspect the edge 804 at high magnification, which can be slow and expensive.

Figure 9:
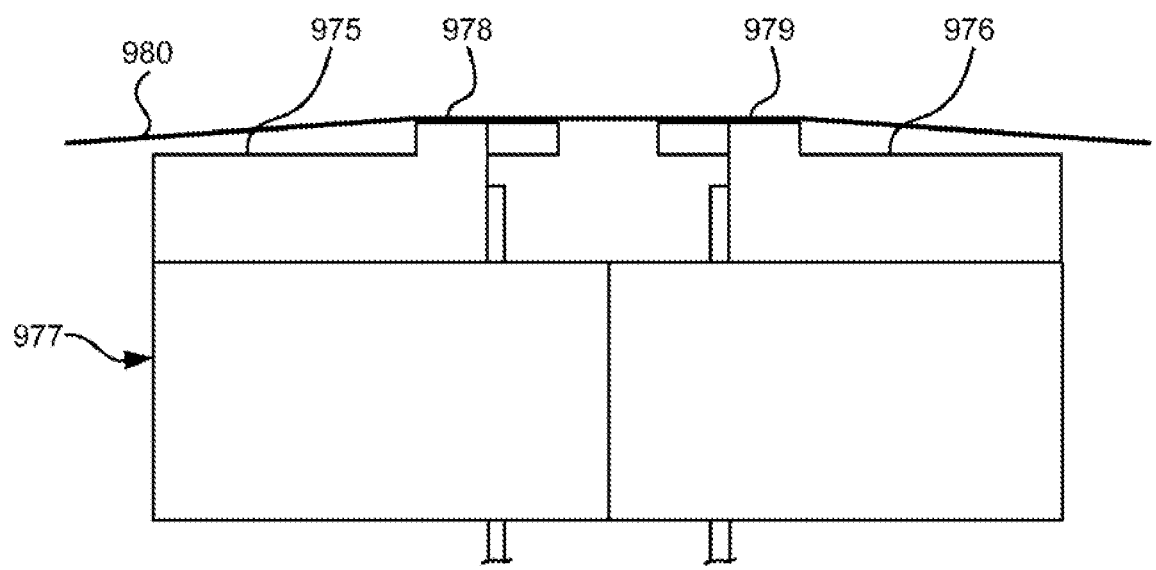
FIG. 9 illustrates the head of FIGS. 8A and 8B in use, in accordance with one embodiment.

FIG. 9 illustrates the head of FIGS. 8A and 8B in use, in accordance with one embodiment. As shown, FIG. 9 illustrates the head of FIGS. 8A and 8B for a read-while-write bidirectional linear tape drive. "Read-while-write" means that the read transducer follows behind the write transducer. This arrangement allows the data just written by the write transducer to be immediately checked for accuracy and true recording by the following read transducer.

Specifically, in FIG. 9, two heads 975 and 976 as illustrated in FIGS. 8A and 8B are mounted on U-beams 977 which are, in turn, adhesively coupled. The wrap angle onto the flat transducing surfaces 978 and 979 of the tape 980 is created by the U-beams 977.

Figure 10:
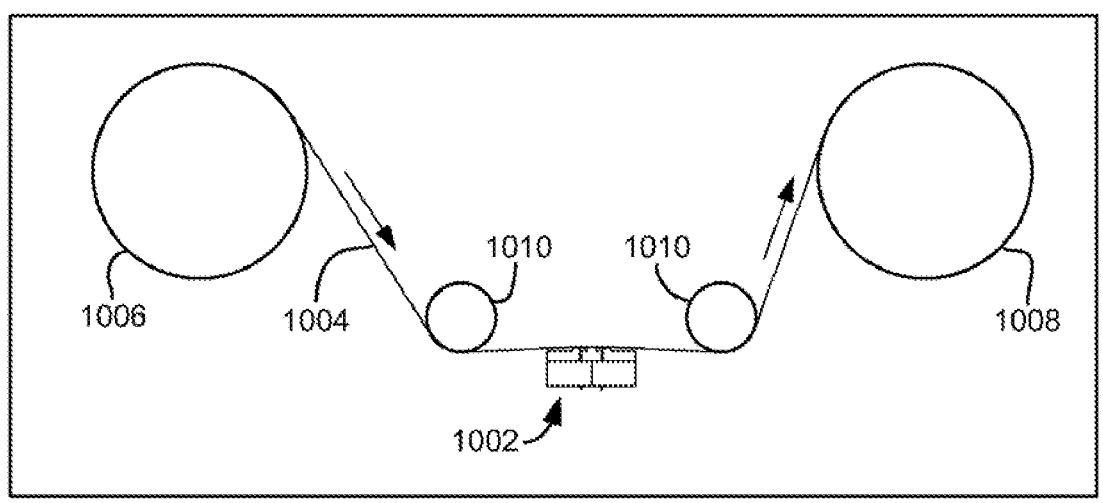
FIG. 10 is a simplified system diagram of a tape drive system according to one embodiment.

Tape drives can be used for storage and retrieval of digital information and for recording and playback of audio or video information. For example in FIG. 10 a typical tape drive 1000 for digital information is shown. The tape drive 1000 has at least one non-rotating recording head 1002. Typically there are several recording heads in a row and the head assembly has the capability of some limited lateral movement to compensate for shifts in tape position. In addition to a recording head 1002 the tape drive 1000 has a tape transport for advancing a tape 1004 from a first reel 1006 to a second reel 1008. The reels 1006, 1008 (sometimes called spools) can be individual devices or they can be contained in a cassette housing. Typically the tape transport includes one or more rollers 1010 to help position and move the tape 1004 across the recording head 1002.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. A tape head manufactured utilizing a process comprising:
    creating a slot in an upper face of a substrate of a tape head, the slot including at least one edge defining an edge of a tape bearing surface of the tape head;
    forming and finishing the air bearing surface of the tape head; and
    performing a grind operation to form a notch in the upper face of the substrate of the tape head, the notch extending from the slot to an outside end of the substrate of the tape head.

2. The tape head as recited in claim 1, wherein the tape bearing surface of the tape head is finished after creating the slot.

3. The tape head as recited in claim 1, wherein the grind operation is performed after finishing the air bearing surface of the tape head.

4. The tape head as recited in claim 1, wherein the slot includes a depth substantially equal to a depth of the notch.

5. The tape head as recited in claim 1, wherein the slot includes a length substantially equal to a length of the notch.

6. The tape head as recited in claim 1, wherein the edge of the tape bearing surface of the tape head includes a defect after the slot is created.

7. The tape head as recited in claim 6, wherein the finishing removes the defect.

8. The tape head as recited in claim 1, wherein the notch facilitates control of a wrap angle of a tape when passing over the tape bearing surface of the tape head.

9. A tape drive system, comprising:
    a tape head manufactured utilizing a process, comprising:
        creating a slot in an upper face of a substrate of the tape head, the slot including at least one edge defining an edge of a tape bearing surface of the tape head,
        forming and finishing the tape bearing surface of the tape head, and
        performing a grind operation to form a notch in the upper face of the substrate of the tape head, the notch extending from the slot to an outside end of the substrate of the tape head; and
    a tape for being moved along the tape head.

10. The tape drive system as recited in claim 9, wherein the tape bearing surface of the tape head is finished after creating the slot.

11. The tape drive system as recited in claim 9, wherein the grind operation is performed after finishing the tape bearing surface of the tape head.

12. The tape drive system as recited in claim 9, wherein the slot includes a depth substantially equal to a depth of the notch.

13. The tape drive system as recited in claim 9, wherein the slot includes a length substantially equal to a length of the notch.

14. The tape drive system as recited in claim 9, wherein the edge of the tape bearing surface of the tape head includes a detect after the slot is created.

15. The tape drive system as recited in claim 14, wherein the finishing removes the defect.

16. The tape drive system as recited in claim 9, wherein the notch facilitates control of a wrap angle of a tape when passing over the tape bearing surface of the tape head.

* * * * *